US012151600B2

(12) United States Patent
Lee et al.

(10) Patent No.: US 12,151,600 B2
(45) Date of Patent: Nov. 26, 2024

(54) CONTROL ARMREST CONTAINMENT STRUCTURE

(71) Applicants: HYUNDAI MOTOR COMPANY, Seoul (KR); KIA CORPORATION, Seoul (KR); HYUNDAI TRANSYS INC., Seosan-si (KR)

(72) Inventors: Seung Young Lee, Seoul (KR); Ki Ryung Lee, Seongnam-si (KR); Sang Ho Kim, Incheon (KR); Eom Seok Yoo, Hwaseong-si (KR); Jae Sung Lee, Pyeongtaek-si (KR); Yong Seong Jang, Gunpo-si (KR)

(73) Assignees: HYUNDAI MOTOR COMPANY, Seoul (KR); KIA CORPORATION, Seoul (KR); HYUNDAI TRANSYS INC., Seosan-si (KR)

( * ) Notice: Subject to any disclaimer, the term of this patent is extended or adjusted under 35 U.S.C. 154(b) by 126 days.

(21) Appl. No.: 18/070,817

(22) Filed: Nov. 29, 2022

(65) Prior Publication Data
US 2023/0191968 A1      Jun. 22, 2023

(30) Foreign Application Priority Data

Dec. 16, 2021   (KR) .......................... 10-2021-0180823

(51) Int. Cl.
*B60N 2/75*          (2018.01)
(52) U.S. Cl.
CPC .............. *B60N 2/77* (2018.02); *B60N 2/753* (2018.02)
(58) Field of Classification Search
CPC .......... B60N 2/77; B60N 2/763; B60N 2/753; A47C 1/0308; A47C 7/543

USPC .............................. 297/411.3, 411.33, 411.36
See application file for complete search history.

(56) References Cited

U.S. PATENT DOCUMENTS

| 1,399,744 | A | * | 12/1921 | Brophy | B60N 2/753 |
| | | | | | 297/411.33 |
| 4,165,901 | A | * | 8/1979 | Swenson | B60N 2/77 |
| | | | | | 297/411.33 |
| 4,244,623 | A | * | 1/1981 | Hall | A47C 1/03 |
| | | | | | 297/162 |
| 4,307,913 | A | * | 12/1981 | Spiegelhoff | B60N 2/77 |
| | | | | | 297/115 |
| 10,426,269 | B1 | * | 10/2019 | O'Hara | A47C 3/026 |
| 2006/0220408 | A1 | * | 10/2006 | Hutek | B60N 2/793 |
| | | | | | 296/37.8 |
| 2015/0232000 | A1 | * | 8/2015 | Yasunobe | B60N 2/77 |
| | | | | | 297/411.32 |
| 2020/0376996 | A1 | * | 12/2020 | Planson | B60N 2/77 |

(Continued)

FOREIGN PATENT DOCUMENTS

KR           10-2139523 B1      7/2020

*Primary Examiner* — Jose V Chen
(74) *Attorney, Agent, or Firm* — MCDONNELL BOEHNEN HULBERT & BERGHOFF LLP (57) ABSTRACT

A control armrest containment structure includes a seat assembly positioned at an end of a seat in a vehicle and an armrest assembly fastened to the seat assembly. The armrest assembly includes a fixed unit fixed to an end of the seat assembly, a movable assembly fastened to an end of the fixed unit and configured to move up and down along the fixed unit, and a rotary unit fastened to an end of the movable unit and configured to rotate with vertical movement of the movable unit.

17 Claims, 5 Drawing Sheets

(56) References Cited

U.S. PATENT DOCUMENTS

| | | | |
|---|---|---|---|
| 2021/0274940 A1* | 9/2021 | Hsieh | A47C 1/0305 |
| 2023/0126209 A1* | 4/2023 | Hoover | B60N 2/929 |
| | | | 297/411.2 |

* cited by examiner

CONTROL ARMREST CONTAINMENT STRUCTURE

CROSS REFERENCE TO RELATED APPLICATIONS

The present application claims priority to Korean Patent Application No. 10-2021-0180823, filed Dec. 16, 2021, the entire contents of which is incorporated herein for all purposes by this reference.

BACKGROUND

Field

The present disclosure relates to a control armrest containment structure and, more preferably, a control armrest containment structure that can be stowed under a seat in a non-use mode by an actuator that is a 2-stage gear and that can perform the armrest function in a use mode.

Description of the Related Art

In general, a console box for temporarily keeping objects is provided between the driver's seat and the passenger seat in a vehicle and an armrest that functions as a cover and enables a passenger in a seat to comfortably put an arm thereon is installed on the console box.

In particular, such an armrest reduces fatigue of a driver by enabling the driver to shift gears, etc. with an arm thereon in long-distance driving.

Simple armrests exist that have a console therein, are disposed at a tunnel part of a floor panel between the driver's seat and the passenger seat, and cover only a portion of a shift lever or a parking brake lever. Additionally, large-sized armrests exist that constitute a portion of an instrument panel, have switches, a radio, a stereo, a heater controller, a holder for small objects, etc., have a box part having a cover with a pad at the rear, and have an ashtray or switches for the backseats.

Meanwhile, techniques about various seating positions of passengers in a vehicle are being studied with the advent of an autonomous age. The position of existing armrests can be adjusted forward/backward only with a driver or a passenger sitting to face the front, so there is a problem that it is difficult to use the armrests when the position of a person in a front seat is changed. Further, as for a seat equipped with a side airbag, an armrest is also mounted on the seatback, so there is a problem of interference.

SUMMARY

A The present disclosure has been made in an effort to solve the problems and an object of the present disclosure is to provide a control armrest containment structure configured to be able to control an armrest use mode by rotating 4-bar linkages of a first armrest and a second armrest using one actuator that is a 2-stage gear.

Another objective of the present disclosure provides a control armrest containment structure of which the maximum diameter is minimized in swiveling because a first armrest and a second armrest are configured to be able to be stowed in a non-use mode.

The objectives of the present disclosure are not limited to those described above and other objectives not stated herein may be understood through the following description and may be clear by embodiments of the present disclosure.

Further, the objectives of the present disclosure will be achieved by the configurations described in claims and combinations thereof.

A control armrest containment structure for achieving the objects of the present disclosure includes the following configuration.

In an embodiment of the present disclosure, the control armrest containment structure includes a seat assembly positioned at an end of a seat in a vehicle and an armrest assembly fastened to the seat assembly, in which the armrest assembly includes a fixed unit fixed to an end of the seat assembly, a movable assembly fastened to an end of the fixed unit and configured to move up and down along the fixed unit, and a rotary unit fastened to an end of the movable unit and configured to rotate with vertical (up-down) movement of the movable unit.

The movable unit may include an actuator configured to apply a driving force to the movable unit and the rotary unit and is configured to move up and down along a rack gear positioned at the fixed unit.

The control armrest containment structure includes a first armrest fastened to an end of the movable unit in contact with the actuator and configured to be rotated into the armrest assembly by a rotation force from the actuator, a second armrest fastened to another end of the movable unit and configured to be rotated into the armrest assembly by a rotation force from the actuator, and a bridge link having a first end fastened to the first armrest and a second end fastened to the second armrest.

When the actuator applies a driving force to the movable unit and the first armrest, the bridge link may be rotated such that the second armrest is rotated.

The actuator may include: an outer gear engaged with the rack gear, and an inner gear engaged with the first armrest.

When a non-use mode is changed to a use mode, the outer gear may be moved to an upper end along the rack gear and the first armrest may be rotated out of the armrest assembly with rotation of the inner gear.

The first end of the bridge link may be rotated by a rotation force of the first armrest and the second end may apply tension to the second armrest such that the second armrest is rotated out of the armrest assembly.

When a use mode is changed to a non-use mode, the outer gear may be moved to a lower end along the rack gear and the first armrest may be rotated into the armrest assembly with rotation of the inner gear.

The first end of the bridge link may be rotated by a rotation force of the first armrest and the second end may apply tension to the second armrest such that the second armrest is rotated into the armrest assembly.

The control armrest containment structure may further include a pin guide formed at an end of the first armrest that is adjacent to the actuator, and a stopper pin connected with the actuator and inserted in the pin guide to move up and down, in which when a non-use mode is changed to a use mode, the stopper pin is moved from an end to another end of the pin guide.

The first armrest and the second armrest may be positioned in the same plane in a height direction in a use mode, and the first armrest may be stowed over the second armrest in a non-use mode.

The first armrest may include a first link having a sector gear, which is in mesh with the inner gear, at a side and a first support positioned at an upper end of the first link and having a hinge shaft configured to rotate the first link, the second armrest may include a second link disposed adjacent to the first link and a second support positioned at an upper end of the second link and having a hinge shaft configured to rotate the second link, and the first end of the bridge link may be fastened to a lower end of the first link and the second end may be fastened to a lower end of the second link.

The first link may include a first rotary shaft fastened to the movable unit, the second link may include a second rotary shaft fastened to the movable unit, the first rotary shaft may be disposed closer to a center further than a position at which the first link is fastened to the bridge link, and the second rotary shaft may be disposed farther from a center further than a position at which the second link is fastened to the bridge link.

When the actuator applies a driving force, the sector gear may be rotated, so the first link may be rotated in one direction and the bridge link may be rotated in another direction.

According to the present disclosure, it is possible to achieve the following effects from the configuration, combination, and operation relationship described below.

The present disclosure has an effect that since it is possible to control the use mode of the armrest using one actuator that is a 2-stage gear, a user can more conveniently used the armrest.

The present disclosure has another effect that since the first armrest and the second armrest can be stowed in the non-use mode, it is possible to maximize usability in terms of a package by minimizing the maximum radius when swiveling a seat.

BRIEF DESCRIPTION OF THE FIGURES

The above and other objectives, features and other advantages of the present disclosure will be more clearly understood from the following detailed description when taken in conjunction with the accompanying drawings, in which.

DETAILED DESCRIPTION

Hereinafter, embodiments of the present disclosure will be described in detail with reference to the accompanying drawings. Embodiments of the present disclosure may be modified in various ways and the scope of the present disclosure should not be construed as being limited to the embodiments to be described below. The embodiments are provided to more completely explain the present disclosure to those skilled in the art.

Terms "~er", "~unit", etc. used herein mean the units for processing at least one function or operation and may be implemented by hardware or a combination of hardware.

In the specification, a "height direction", a "width direction", and a "longitudinal direction" are based on a vehicle.

When an element is "on" or "over" another component in the specification, it can be directly on the other element or intervening elements may be present therebetween. When an element is "beneath" or "under" another component, it can be directly beneath the other element or intervening elements may be present therebetween.

The term "upper end" stated herein means a direction going to the upper end in the height direction in drawings and the term "lower end" means a direction going to the lower end in the height direction in drawings.

Some components are given terms 'first', 'second', etc. for discrimination throughout the specification because they have the same names, but they are not necessarily limited to the order in the following description.

The term "outside" means a direction in which a first armrest 231 and a second armrest 232 are deployed in the height direction when an armrest assembly 200 is mounted in a vehicle, and the term "inside" means a direction in which the first armrest 231 and the second armrest 232 are folded downward.

The present disclosure is based on a side of a seat, but may be applied to both sides of a seat or may be symmetrically applied to seats of several rows.

Figure 1:
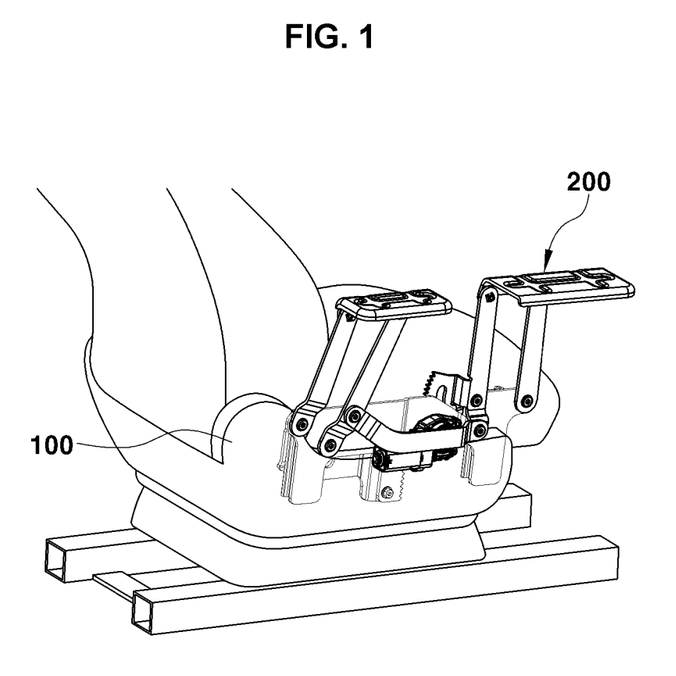
FIG. 1 is a perspective view of a control armrest containment structure as an embodiment of the present disclosure.
Figure 2:
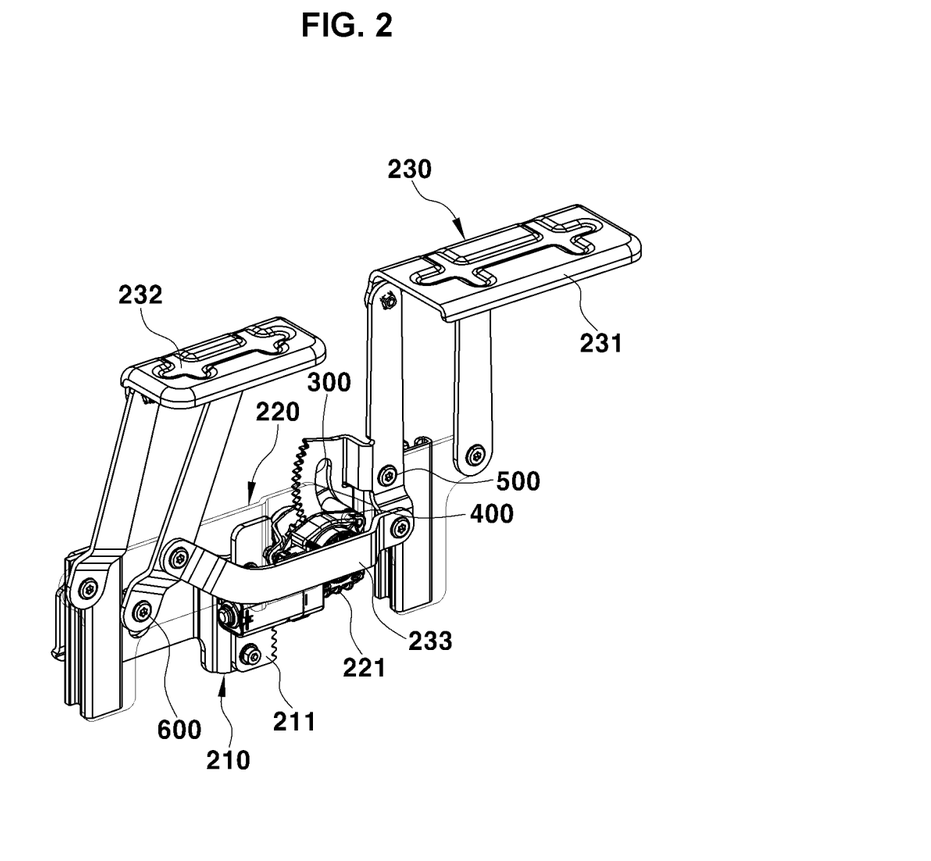
FIG. 2 is a perspective view of an armrest assembly of the control armrest containment structure as an embodiment of the present disclosure.

FIG. 1 is a perspective view of a control armrest containment structure as an embodiment of the present disclosure and FIG. 2 is a perspective view of an armrest assembly of the control armrest containment structure as an embodiment of the present disclosure.

Referring to FIGS. 1 and 2, a control armrest containment structure according to an embodiment of the present disclosure may be configured to include a seat assembly 100 and an armrest assembly 200. The armrest assembly 200 fastened to a side of the seat assembly 100 may be configured to include a fixed unit 210 fixed to the seat assembly 100, and a movable unit 220 and a rotary unit 230 that are moved along a side of the seat assembly 100.

The seat assembly 100 may be positioned at an end of a seat in a vehicle. The seat assembly 100 may include a side member disposed adjacent to a side cushion of a seat, and a bracket for fixing the armrest assembly 200.

The armrest assembly 200 may be fastened to the seat assembly 100. The armrest assembly 200 may have a main bracket for fixing to the seat assembly 100 and may be fastened to the bracket of the seat assembly 100 through a plurality of fixing members. The armrest assembly 200 may be configured to include a fixed unit 210, a movable unit 220, and a rotary unit 230.

The fixed unit 210 may be configured to be fixed to an end of the seat assembly 100. The fixed unit 210 may include a main bracket and may be configured to be fixed to the seat assembly 100. The fixed unit 210 may further include a rack gear 211 configured to move up and down the movable unit 220 and a guide bracket guiding vertical (up-down) movement of the movable unit 220.

The movable unit 220 may be fastened to an end of the fixed unit 210 to move up and down along the fixed unit 210. In detail, the movable unit 220 may be configured to move up and down along the rack gear 211 positioned on the fixed unit 210. The movable unit 220 may include a main panel connected to the guide bracket. The movable unit 220 may include an actuator 221 that applies a driving force to the movable unit 220 and the rotary unit 230. The actuator 221 may be fastened and fixed to the main panel. The main panel can move up and down along the guide bracket.

The rotary unit 230 may be fastened to an end of the movable unit 220 to rotate with vertical (up-down) movement of the movable unit 220. The rotary unit 230 may be configured to include a first armrest 231, a second armrest 232, and a bridge link 233. The first armrest 231 and the second armrest 232 may be fastened to both sides of the main panel, respectively. The bridge link 233 may be configured to connect the lower ends of the first armrest 231 and the second armrest 232.

The first armrest 231 may be fastened to an end of the movable unit 220 in contact with the actuator 221. As an embodiment, the first armrest 231 may be a controller. The first armrest 231 may be rotatably fastened to the main panel through a hinge shaft. In detail, the first armrest 231 may be configured to be rotated into the armrest assembly 200 by a rotation force from the actuator 221. An end of the first armrest 231 may be engaged with the actuator 221 to receive a rotation force from the actuator 221.

The second armrest 232 may be fastened to another of the movable unit 220. The second armrest 232 may be rotatably fastened to the main panel through a hinge shaft. In detail, the second armrest 232 may be configured to be rotated into the armrest assembly 200 by a rotation force from the actuator 221.

The bridge link 233 may be fastened at a first end to the first armrest 231 and at a second end to the second armrest 232. The first end of the bridge link 233 may be fastened to the lower end of the first armrest 231 and the second end thereof may be fastened to the lower end of the second armrest 232.

The control armrest containment structure according to an embodiment of the present disclosure may be configured such that when the actuator 221 applies a driving force to the movable unit 220 and the first armrest 231, the bridge link 233 is rotated and the second armrest 232 is rotated. In detail, the actuator 221 may be configured to apply a driving force for moving up and down the movable unit 220 and a driving force for rotating the first armrest 231.

The first end of the bridge link 233 may be configured to be rotated and to rotate the second armrest 232 when the first armrest 231 is rotated. The bridge link 233 may be configured such that the first end receives a rotation force from the first armrest 231 and the second end applies tension to the second armrest 232.

In an embodiment, the first armrest 231 may be positioned adjacent to the seat assembly 100 in the width direction further than the second armrest 232. As another embodiment, the second armrest 232 may be positioned adjacent to the seat assembly 100 in the width direction further than the first armrest 231. The first armrest 231 and the second armrest 232 may be configured to be deployed out of the armrest assembly 200 without interfering with each other.

Figure 3:
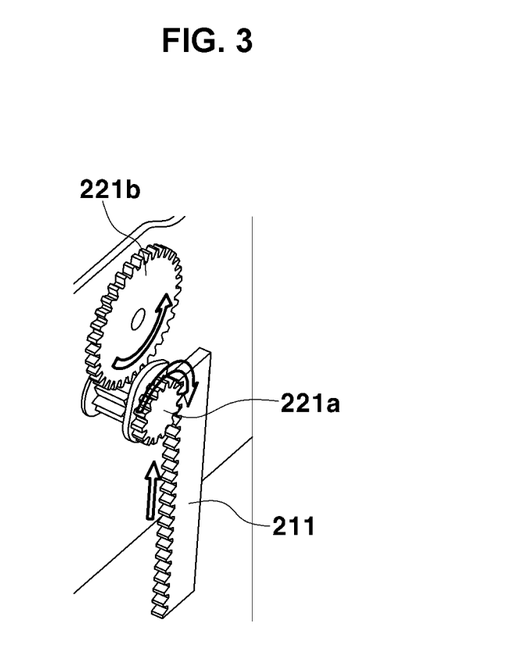
FIG. 3 is a perspective view of an outer gear and an inner gear of an actuator of the control armrest containment structure as an embodiment of the present disclosure.

FIG. 3 is a perspective view of an outer gear 221a and an inner gear 221b of the actuator 221 of the control armrest containment structure as an embodiment of the present disclosure.

Referring to FIG. 3, the actuator 221 may be a 2-stage gear. The actuator 221 may include an outer gear 221a configured to engage with the rack gear 211 and an inner gear 221b configured to engage with the first armrest 231. When the actuator 221 is operated, the outer gear 221a and the inner gear 221b are simultaneously rotated, and vertical (up-down) movement of the movable unit 220 and rotation of the first armrest 231 are simultaneously made.

In detail, the outer gear 221a may be configured to move up and down along the teeth of the rack gear 211. As an embodiment, the outer gear 221a may be a pinion gear engaged with the rack gear 211. When the actuator 221 is operated, the outer gear 221a may be rotated and the actuator 221 is moved up and down along the rack gear 211.

The inner gear 221b may be configured to engage the first armrest 231 to apply rotational power to the first armrest 231. In an embodiment, the inner gear 221b may be a spur gear. In another embodiment, the inner gear 221b may be a helical gear and a thrust bearing may be additionally provided. A sector gear engaged with the inner gear 221b may be disposed on a side of the first armrest 231. When the actuator 221 is operated, a rotation force may be applied to the inner gear 221b and the first armrest 231 may be rotated.

Figure 4:
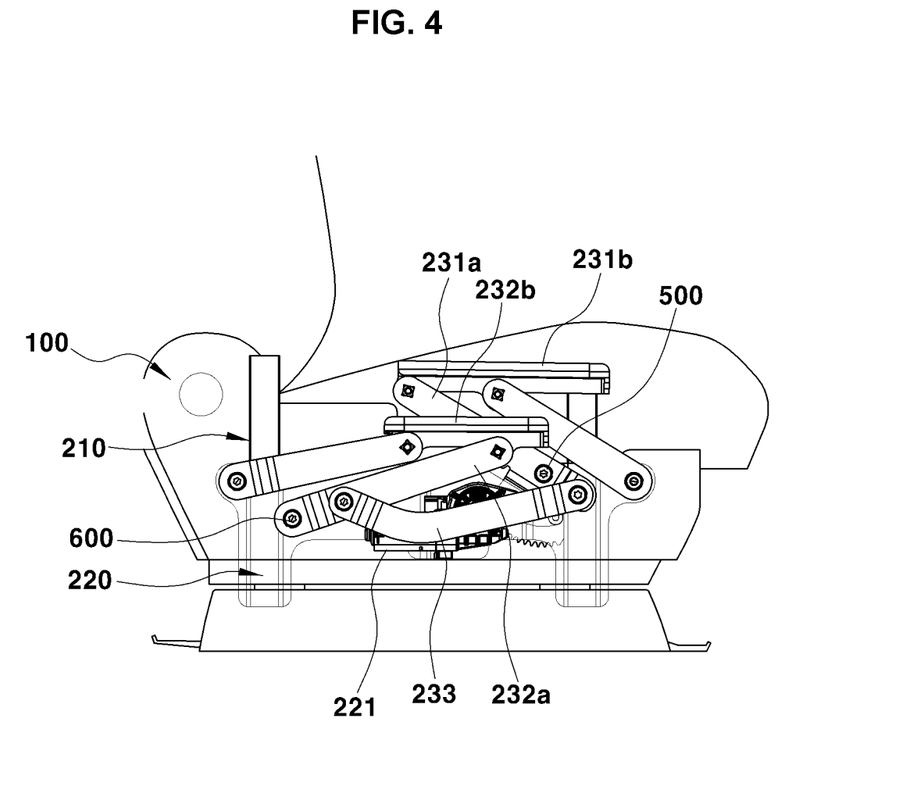
FIG. 4 shows a non-use mode of the control armrest containment structure as an embodiment of the present disclosure.

FIG. 4 shows a non-use mode of the control armrest containment structure as an embodiment of the present disclosure.

Referring to FIG. 4, the first armrest 231 may be composed of a first link 231a and a first support 231b and the second armrest 232 may be composed of a second link 232a and a second link 232b. The sector gear 232a engaged with the inner gear 221b may be disposed on a side of the first link 231a. In detail, the first link 231a may be a rod of which the lower end is fastened to an end of the movable unit 220 and the upper end is fastened to the first support 231b. The first support 231b may be positioned at the upper end of the first link 231a and may have a hinge shaft configured to rotate the first link 231a. The first link 231a may be hinged at the lower end to the movable unit 220 and at the upper end to the first support 231b to rotate.

The second link 232a may be disposed adjacent to the first link 231a. The second link 232a may be a rod of which the lower end is fastened to an end of the movable unit 220 and the upper end is fastened to the second support 232b. The second support 231b may be positioned at the upper end of the second link 232a and may have a hinge shaft configured to rotate the second link 232a. The second link 232a may be hinged at the lower end to the movable unit 220 and at the upper end to the second support 232b to rotate.

The bridge link 233 may be configured such that the first end is fastened to the lower end of the first link 231a and the second end is fastened to the lower end of the second link 232a. The bridge link 233 may be configured such that the first end is fastened at a predetermined distance from a rotary shaft of the first link 231a and the second end is fastened at a predetermined distance from a rotary shaft of the second link 232a.

In detail, the first link 231a may be configured to include a first rotary shaft 500 fastened to the movable unit 220. The second link 232a may be configured to include a second rotary shaft 600 fastened to the movable unit 220. The first rotary shaft 500 may be disposed closer to the center than the position at which the first link 231a is fastened to the bridge link 233. The second rotary shaft 600 may be disposed farther from the center than the position at which the second link 232a is fastened to the bridge link 233. Accordingly, when the actuator 221 applies a driving force, the sector gear is rotated, so the first link 231a is rotated in one direction and the bridge link 233 is rotated in another direction.

The control armrest containment structure according to an embodiment of the present disclosure may be configured such that when the use mode is changed to the non-use mode, the outer gear 221a is moved to the lower end along the rack gear 211 and the first armrest 231 is rotated into the armrest assembly 200 with rotation of the inner gear 221b.

When the use mode is changed to the non-use mode, the outer gear 221a of the actuator 221 may be moved to the lower end along the rack gear 211, and the movable unit 220 and the rotary unit 230 may be moved to the lower end. Further, the first armrest 231 may be rotated and folded inward by the rotation force of the inner gear 221b. Accordingly, sequentially, the bridge link 233 may be configured such that the first end is rotated by the rotation force of the first armrest 231 and the second end applies tension to the second armrest 232 to rotate the second armrest 232 into the armrest assembly 200. In the non-use mode, the first armrest 231 may be stowed over the second armrest 232.

The first rotary shaft 500 may be disposed at a portion under the center of gravity of the first link 231a and the bridge link 233 may be fastened at a predetermined distance outward from the first rotary shaft 500. Accordingly, when the first link 231a is rotated, the first end of the bridge link 233 can be rotated in the opposite direction to the rotation direction of the first link 231a. As an embodiment, when the use mode is changed to the non-use mode, the sector gear is rotated, so the first link 231a can be rotated counterclockwise in the drawings and the first end of the bridge link 233 can be correspondingly rotated clockwise.

The second rotary shaft 600 may be disposed at a portion under the center of gravity of the second link 232a and the bridge link 233 may be fastened at a predetermined distance inward from the second rotary shaft 600. Accordingly, when the first end of the bridge link 233 is rotated, the second end of the bridge link 233 may apply tension to the second link 232a such that the second link 232a is rotated. As an embodiment, when the use mode is changed to the non-use mode, the bridge link 233 can pull the second link 232a and accordingly the second link 232a can be rotated clockwise.

Figure 5:
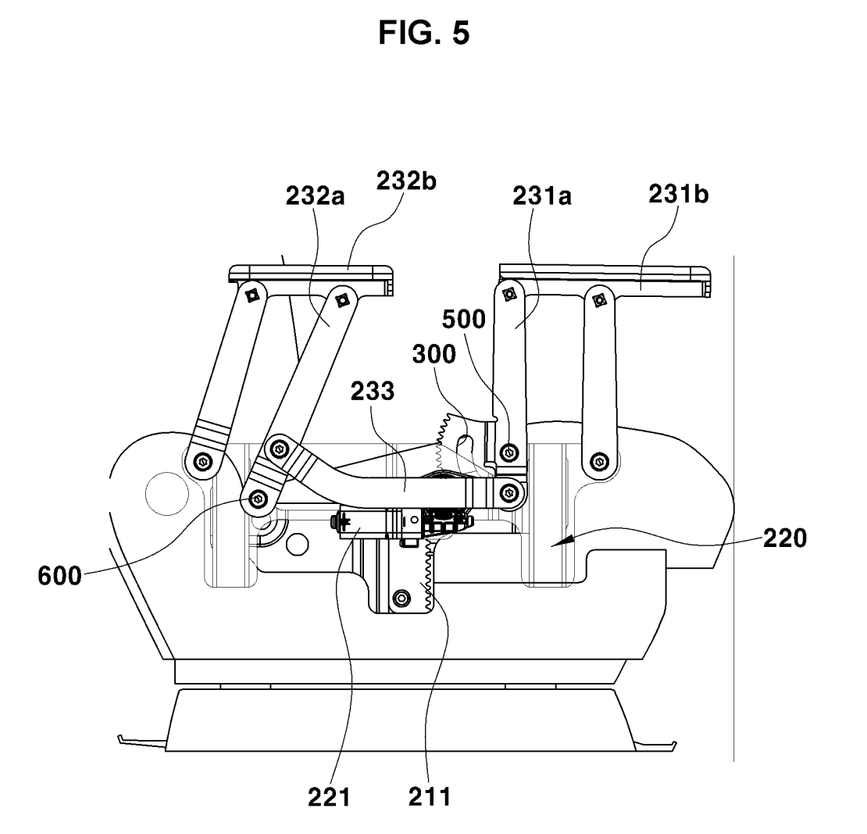
FIG. 5 shows a use mode of the control armrest containment structure as an embodiment of the present disclosure.

FIG. 5 shows a use mode of the control armrest containment structure as an embodiment of the present disclosure.

Referring to FIG. 5, the control armrest containment structure according to an embodiment of the present disclosure may be configured such that when the non-use mode is changed to the use mode, the outer gear 221a is moved to the upper end along the rack gear 211 and the first armrest 231 is rotated out of the armrest assembly 200 with rotation of the inner gear 221b. Accordingly, sequentially, the first end of the bridge link 233 is rotated by the rotation force of the first armrest 231 and the second end applies tension to the second armrest 232 such that the second armrest 232 is rotated out of the armrest assembly 200.

In the use mode, the first armrest 231 and the second armrest 232 may be positioned in the same plane in the height direction. That is, the first armrest 231 and the second armrest 232 may be positioned to function as one armrest in the use mode. As an embodiment, in the use mode, the first armrest 231 may support a user's hand and the second armrest 232 may support the user's arm.

When the non-use mode is changed to the use mode, the outer gear 221a of the actuator 221 may be moved to the upper end along the rack gear 211, and the movable unit 220 and the rotary unit 230 may be moved to the upper end. Further, the first armrest 231 may be rotated and deployed outward by the rotation force of the inner gear 221b. Accordingly, sequentially, the first end of the bridge link 233 is rotated by the rotation force of the first armrest 231 and the second end applies tension to the second armrest 232 such that the second armrest 232 is rotated out of the armrest assembly 200.

In an embodiment, when the non-use mode is changed to the use mode, the sector gear is rotated, so the first link 231a can be rotated clockwise in the drawings and the first end of the bridge link 233 can be correspondingly counterclockwise. Further, the bridge link 233 can push the second link 232a, whereby the second link 232a can be rotated counterclockwise.

Meanwhile, the control armrest containment structure according to the present disclosure may include a pin guide 300 and a stopper pin 400 to limit an operation stroke when the non-use mode is changed to the use mode. In detail, the pint guide 300 may be disposed at an end of the first armrest 231 that is adjacent to the driving unit 221. The stopper pin 400 may be connected with the actuator 221 and inserted in the pin guide 300 to move up and down.

When the non-use mode is changed to the use mode, the stopper pin 400 can move from an end to another end of the pin guide 300. The pin guide 300 may be configured to limit the rotation amount of the first armrest 231 by limiting the movement amount of the stopper pin 400. Accordingly, the rotation amount of the bridge link 233 is also limited and the tension that is applied to the second armrest 232 by the bridge link 233 is limited, so the rotation amount of the second armrest 232 can also be limited.

In short, the present disclosure provides a control armrest containment structure that can be stowed under a seat in the non-use mode and can function as an armrest in the use mode by the actuator 221 that is a 2-stage gear.

The specification provides examples of the present disclosure. Further, the description provides an embodiment of the present disclosure and the present disclosure may be used in other various combination, changes, and environments. That is, the present disclosure may be changed or modified within the scope of the present disclosure described herein, a range equivalent to the description, and/or within the knowledge or technology in the related art. The embodiment shows an optimum state for achieving the spirit of the present disclosure and may be changed in various ways for the detailed application fields and use of the present disclosure. Therefore, the detailed description of the present disclosure is not intended to limit the present disclosure in the embodiment. Further, the claims should be construed as including other embodiments.

The invention claimed is:

1. A control armrest containment structure comprising:
   a seat assembly positioned at an end of a seat in a vehicle; and
   an armrest assembly fastened to the seat assembly;
   wherein the armrest assembly includes:
   a fixed unit fixed to an end of the seat assembly;
   a movable unit fastened to an end of the fixed unit and configured to move up and down along the fixed unit; and
   a rotary unit fastened to an end of the movable unit and configured to rotate with vertical movement of the movable unit;
   wherein the rotary unit is configured to rotate by the vertical movement of the movable unit with respect to the fixed unit.

2. The control armrest containment structure of claim 1, wherein the movable unit includes an actuator configured to apply a driving force to the movable unit and the rotary unit, and wherein the movable unit is configured to move up and down along a rack gear positioned at the fixed unit.

3. The control armrest containment structure of claim 2, wherein the rotary unit includes:
   a first armrest fastened to an end of the movable unit and in contact with the actuator, the first armrest being configured to be rotated into the armrest assembly by a rotation force from the actuator;
   a second armrest fastened to an other end of the movable unit and configured to be rotated into the armrest assembly by a rotation force from the actuator; and
   a bridge link having a first end fastened to the first armrest and a second end fastened to the second armrest.

4. The control armrest containment structure of claim 3, wherein when the actuator applies a driving force to the movable unit and the first armrest, the bridge link is rotated such that the second armrest is rotated.

5. The control armrest containment structure of claim 3, wherein the actuator includes:
   an outer gear engaged with the rack gear; and
   an inner gear engaged with the first armrest.

6. The control armrest containment structure of claim 5, wherein when a use mode is changed to a non-use mode, the outer gear is moved to a lower end along the rack gear and the first armrest is rotated into the armrest assembly with rotation of the inner gear.

7. The control armrest containment structure of claim 6, wherein the first end of the bridge link is rotated by a rotation force of the first armrest and the second end applies tension to the second armrest such that the second armrest is rotated into the armrest assembly.

8. The control armrest containment structure of claim 5, wherein the first armrest includes:
   a first link having a sector gear engaged with the inner gear at a side; and
   a first support positioned at an upper end of the first link and having a hinge shaft configured to rotate the first link,
   the second armrest includes:
   a second link positioned adjacent to the first link; and
   a second support positioned at an upper end of the second link and having a hinge shaft configured to rotate the second link; and
   the first end of the bridge link is fastened to a lower end of the first link and the second end is fastened to a lower end of the second link.

9. The control armrest containment structure of claim 8, wherein the first link includes a first rotary shaft fastened to the movable unit,
   the second link includes a second rotary shaft fastened to the movable unit,
   the first rotary shaft is positioned closer to a center further than a position at which the first link is fastened to the bridge link, and
   the second rotary shaft is positioned farther from a center and further than a position at which the second link is fastened to the bridge link.

10. The control armrest containment structure of claim 9, wherein when the actuator applies a driving force, the sector gear is rotated, so the first link is rotated in one direction and the bridge link is rotated in another direction.

11. The control armrest containment structure of claim 5, wherein when a non-use mode is changed to a use mode, the outer gear is moved to an upper end along the rack gear and the first armrest is rotated out of the armrest assembly with rotation of the inner gear.

12. The control armrest containment structure of claim 11, wherein the first end of the bridge link is rotated by a rotation force of the first armrest and the second end applies tension to the second armrest such that the second armrest is rotated out of the armrest assembly.

13. The control armrest containment structure of claim 3, further comprising:
   a pin guide formed at an end of the first armrest that is adjacent to the actuator; and
   a stopper pin connected with the actuator and inserted in the pin guide to move up and down;
   wherein when a non-use mode is changed to a use mode, the stopper pin is moved from one end to the other end of the pin guide.

14. The control armrest containment structure of claim 3, wherein the first armrest and the second armrest are positioned in the same plane in a height direction in a use mode, and
   the first armrest is stowed over the second armrest in a non-use mode.

15. A control armrest containment structure comprising:
   a seat assembly positioned at an end of a seat in a vehicle; and
   an armrest assembly fastened to the seat assembly;
   wherein the armrest assembly includes:
   a fixed unit fixed to an end of the seat assembly;
   a movable assembly fastened to an end of the fixed unit and configured to move up and down along the fixed unit; and
   a rotary unit fastened to an end of the movable unit and configured to rotate with vertical movement of the movable unit;
   wherein the movable unit includes an actuator configured to apply a driving force to the movable unit and the rotary unit, and wherein the movable unit is configured to move up and down along a rack gear positioned at the fixed unit; and
   wherein the rotary unit includes:
   a first armrest fastened to an end of the movable unit and in contact with the actuator, the first armrest being configured to be rotated into the armrest assembly by a rotation force from the actuator;
   a second armrest fastened to an other end of the movable unit and configured to be rotated into the armrest assembly by a rotation force from the actuator; and
   a bridge link having a first end fastened to the first armrest and a second end fastened to the second armrest.

16. A seat comprising:
   an armrest assembly, wherein the armrest assembly comprises:
   a fixed unit;
   a movable unit connected to the fixed unit and configured to linearly move with respect to the fixed unit; and
   a rotary unit rotatably coupled to the movable unit, wherein the rotary unit is configured to rotate in connection with linear movement of the movable unit;
   wherein the fixed unit comprises a rack gear, and wherein the movable unit comprises an actuator configured to apply a driving force to the movable unit and the rotary unit, wherein the actuator comprises an outer gear engaged with the rack gear and an inner gear engaged with the rotary unit.

17. The seat of claim 16, wherein the rotary unit comprises:
   a first armrest rotatably coupled to the movable unit and operatively associated with the inner gear;
   a second armrest rotatably coupled to the movable unit; and
   a bridge link connecting the first armrest and the second armrest to each other.

* * * * *